United States Patent [19]

Chung

[11] Patent Number: 5,789,468
[45] Date of Patent: Aug. 4, 1998

[54] INTERNAL ANTICRATERING AGENT FOR CATHODIC ELECTROCOATING COMPOSITIONS

[75] Inventor: Ding Yu Chung, Rochester Hills, Mich.

[73] Assignee: E. I. du Pont de Nemours and Company, Wilmington, Del.

[21] Appl. No.: 828,975

[22] Filed: Mar. 27, 1997

[51] Int. Cl.$^6$ .................... C08K 3/20; C08L 63/00
[52] U.S. Cl. .................... 523/417; 523/414; 204/505; 204/506
[58] Field of Search .................... 523/414, 417; 204/505, 506

[56] References Cited

U.S. PATENT DOCUMENTS

| | | | |
|---|---|---|---|
| 4,142,018 | 2/1979 | Ozawa et al. | 428/323 |
| 4,223,097 | 9/1980 | Johannes et al. | 525/107 |
| 4,264,656 | 4/1981 | Reeder | 427/385.5 |
| 4,419,467 | 12/1983 | Wismer et al. | 523/414 |
| 4,420,574 | 12/1983 | Moriarity et al. | 523/404 |
| 4,423,166 | 12/1983 | Moriarity et al. | 523/414 |
| 4,432,850 | 2/1984 | Moriarity et al. | 204/181 |
| 4,605,690 | 8/1986 | Debroy et al. | 523/414 |
| 4,612,338 | 9/1986 | Chung et al. | 523/414 |
| 4,615,779 | 10/1986 | McCollum et al. | 204/181.7 |
| 4,689,131 | 8/1987 | Roue et al. | 204/181.7 |
| 4,711,917 | 12/1987 | McCollum et al. | 523/400 |
| 4,810,535 | 3/1989 | McCollum et al. | 427/410 |
| 4,857,580 | 8/1989 | Patzschke et al. | 524/507 |
| 4,891,111 | 1/1990 | McCollum et al. | 204/181.7 |
| 4,920,162 | 4/1990 | Clark et al. | 523/400 |
| 5,002,998 | 3/1991 | Carey et al. | 524/555 |
| 5,021,502 | 6/1991 | Patzschke et al. | 524/591 |
| 5,026,743 | 6/1991 | Bresford et al. | 523/404 |
| 5,063,114 | 11/1991 | Nambu et al. | 428/447 |
| 5,109,040 | 4/1992 | Honig et al. | 523/411 |
| 5,298,538 | 3/1994 | Cibura et al. | 523/404 |
| 5,330,627 | 7/1994 | Grutter et al. | 204/181.4 |
| 5,356,960 | 10/1994 | Chung et al. | |
| 5,374,340 | 12/1994 | Ott et al. | 204/181.7 |
| 5,380,412 | 1/1995 | Ott et al. | 204/181.7 |
| 5,425,970 | 6/1995 | Lahrmann et al. | 427/493 |
| 5,525,650 | 6/1996 | Clark et al. | 523/400 |
| 5,559,174 | 9/1996 | Clark et al. | 523/428 |
| 5,582,704 | 12/1996 | Valko et al. | 204/501 |

FOREIGN PATENT DOCUMENTS

| | | | |
|---|---|---|---|
| 0 595 356 A2 | 10/1993 | European Pat. Off. | C09D 5/44 |
| 611 5974-A | 6/1986 | Japan. | |
| 6222 3278-A | 10/1987 | Japan | C09D 5/44 |
| 0515 8273-A | 6/1993 | Japan | G03G 5/147 |
| 0627 1652-A | 9/1994 | Japan | C08G 59/50 |
| 0628 7484-A | 10/1994 | Japan | C09D 5/44 |

Primary Examiner—Melvyn I. Marquis
Assistant Examiner—D. Aylward
Attorney, Agent, or Firm—Hilmar L. Fricke

[57] ABSTRACT

An improved aqueous cathodic electrocoating composition having a binder of an epoxy-amine adduct and a blocked polyisocyanate crosslinking agent; wherein the improvement is the incorporation of an anticrater agent which is a polyoxyalkylene diamine having a number average molecular weight of about 700–5,000 by reacting it with the epoxy resin of the epoxy-amine adduct; wherein the amine to epoxy equivalence ratio of amine groups of the polyoxyalkylene diamine to epoxy groups of the epoxy resin of the epoxy amine adduct is within the range of 0.01–0.90 to 1 and the resulting epoxy amine adduct has a number average molecular weight of about 1,500–20,000; where the above molecular weights are determined by Gel Permeation Chromatography (GPC) using polystyrene as the standard.

10 Claims, No Drawings

INTERNAL ANTICRATERING AGENT FOR CATHODIC ELECTROCOATING COMPOSITIONS

BACKGROUND OF THE INVENTION

This invention is directed to a cathodic electrocoating composition and in particular to a cathodic electrocoating composition containing an anticrater agent which is incorporated directly into the cathodic film forming resin of the electrocoating composition and significantly reduces craters and improves the smoothness of electrodeposited films of the composition.

The coating of electrically conductive substrates by an electrodeposition process, also called an electrocoating process, is a well known and important industrial process. Electrodeposition of primers to metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition, until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through a reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. 4,419, 467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters and other imperfections in the cured finish. Typically, an anticrater additive or agent is added to the electrocoating composition to form a crater-free, smooth and even finish. Anti crater additives are shown in Chung et al U.S. Pat. No. 5,356,960 issued Oct. 18, 1994 and patents to Moriarity et al U.S. Pat. No. 4,420,574 issued Dec. 13, 1983, U.S. Pat. No. 4,423,166 issued Dec. 27, 1983 and U.S. Pat. No. 4,432,850 issued Feb. 21, 1984. However, when an anticrater additive is used in an electrocoating composition that is baked in an indirect gas fired oven or in an electric oven after electrodeposition to a metal substrate such as an automobile or truck body, the anticrater additives taught by these references readily migrate to the surface of the electrodeposited coating during baking. Any primer compositions containing polymeric melamine crosslinking agents applied over such a surface, adhere poorly to the electrodeposited coating and cause an adhesion failure of a topcoat applied over such a primer. It would be desirable to eliminate the anticrater additive from the composition and chemically incorporate the additive directly in the film forming of the electrocoating composition resin. This would significantly reduce and possibly stop surface migration of the additive and should not adversely affect other properties of the electrocoating bath such as the throwing power of the bath or the curing of the deposited coating or the film properties of the resulting finish.

SUMMARY OF THE INVENTION

An improved aqueous cathodic electrocoating composition having a binder of an epoxy-amine adduct and a blocked polyisocyanate crosslinking agent; wherein the improvement is the incorporation of an anticrater agent which is a polyoxyalkylene diamine having a number average molecular weight of about 700–5,000 by reacting it with the epoxy resin of the epoxy-amine adduct; wherein the amine to epoxy equivalence ratio of amine groups of the polyoxyalkylene diamine to epoxy of the epoxy resin of the epoxy amine adduct is within the range of 0.01 –0.90 to 1 and the resulting epoxy amine adduct has a number average molecular weight of about 1,500 –20,000; wherein the above molecular weights are determined by Gel Permeation Chromatography (GPC) using polystyrene as the standard.

DETAILED DESCRIPTION OF THE INVENTION

The anticrater agent is incorporated into the epoxy amine adduct which is the film forming component of the electrocoating composition by reacting the polyoxyalkylene diamine with the epoxy resin component used in the adduct. The anticrater agent is part of the film forming component of the electrocoating composition and cannot migrate to the surface on baking and cause problems of adhesion failure but still functions as an anticrater agent and provides a smooth and even finish on baking. Since the anticrater agent is an integral part of the epoxy amine adduct, it is stable in the electrocoating composition and in the electrocoating bath for extended periods of time and it significantly reduces and often eliminates craters in electrodeposited coatings and smooth and even finishes are formed. Also, the anticrater agent when it is an integral portion of the adduct, does not adversely affect other properties of the electrocoating bath or finishes of the electrocoating composition. Further, the anticratering agent improves rheology control and improves the edge protection of an electrodeposited finish.

The amount of anticrater agent used in the epoxy amine adduct is relatively small and is used in a amine to epoxy equivalence ratio of amine groups to epoxy groups of about 0.01 to 0.90 to 1 and preferably in a ratio of about 0.01 to 0.2 to 1. The anticrater agent of a polyoxyalkylene diamine is added with to the constituents of the epoxy amine adduct and the constituents are reacted at a temperature of about 50° to 130° C. for about 1 to 5 hours to form an adduct having a number average molecular weight of about 1,500 –20,000 determined as described above.

The polyoxyalkylene diamine used to form the anticrater agent has 2–4 carbon atoms in the alkylene group and preferably is polyoxypropylene diamine having number average molecular weight of about 230–3,000 preferably, 1,500–2,500 such as Jeffamine D-2000® having a number average molecular weight of about 2000 available from Huntsman Corporation. Another polyoxyalkylene diamine that can be used is polyoxyethylene diamine having a similar molecular weight.

About 0.01–8% by weight, based on the weight of the epoxy amine adduct, of an epoxy silane can be incorporated into the adduct to enhance rust protection properties; preferably about 2–6% by weight of the epoxy silane is used. The epoxy silane reacts with the amine groups of the epoxy amine adduct. Typical epoxy silanes are glycidoxy alkyl alkoxy silanes that have the formula

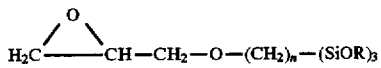

where R is methyl, ethyl, or a mixture of methyl and ethyl and n is 1–3. Typical silanes are gamma-glycidoxy propyl trimethoxy silane, gamma-glycidoxy ethyl trimethoxy silane, gamma-glycidoxy methyl trimethoxy silane, gamma-glycidoxy methyl triethoxy silane, gamma-glycidoxy ethyl triethoxy silane, gamma-glycidoxy propyl triethoxy silane. Gamma-glycidoxy propyl trimethoxy silane is preferred to form a high quality anticrater agent. Another useful glycidyl functional alkyl alkoxy silanes is beta-(3,4-epoxycyclohexyl)ethyl trimethoxy silane.

The epoxy amine adduct is the reaction product of an epoxy resin of a polyglycidyl ether and a polyphenol and an amine. The resulting epoxy amine adduct has reactive amine and epoxy groups. The epoxy resin which is a poly epoxy hydroxy ether resin has a 1,2-epoxy equivalency of about two or more, that is, a polyepoxide which has on an average basis two or more epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2, bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-bis(hydroxymethyl)cyclohexane, 1,3-bis-(hydroxymethyl)cyclohexane, 1,2cyclohexane diol, 1,4, cyclohexane diol and hydrogenated bisphenol A.

The polyepoxides have molecular weights of at least 200 and preferably within the range of 200 to 3000, and more preferably about 340 to 2000.

The polyepoxide resin can be chain extended for example with any of the aforementioned polyhydric phenols such as bis phenol A and ethoxylated bis phenol A and preferably a combination of these phenols. Also, the polyepoxides can be chain extended with a polyether or a polyester polyol which enhances flow and coalescence. Typical useful chain extenders are polyols such as polycaprolactone diols such as Tone 200® series available from Union Carbide Corporation and ethyoxylated Bisphenol A such as SYNFAC 8009® available from Milliken Chemical Company.

Examples of polyether polyols and conditions for chain extension are disclosed in U.S. Pat. No. 4,468,307.

Examples of polyester polyols for chain extension are disclosed in Marchetti et al U.S. Pat. No. 4,148,772 issued Apr. 10, 1979.

The amines used to prepare the epoxy amine adduct can be primary or secondary amines or mixtures thereof. Preferred amines are monoamines, particularly hydroxyl containing amines such as alkanol amines, dialkanol amines, trialkanol amines, alkyl alkanol amines, arylalkanol amines and arylalkylalkanolamines containing from 2–18 carbon atoms in the aryl, alkyl and aryl chains. Typically, useful amines include ethanolamine, methyl ethanol amine, N-methyl-ethanolamine, diethanolamine, N-phenylethanolamine, and the like. Other amines that can be used are set forth in U.S. Pat. No. 4,419,467 which is hereby incorporated by reference.

The cathodic binder of the epoxy amine adduct and the blocked isocyanate are the principal resinous ingredients in the electrocoating composition and are usually present in amounts of about 30 to 50% by weight of solids of the composition. The binder is neutralized with an acid to form a water soluble product. Typically useful acids are lactic acid, acetic acid, formic acid, sulfamic acid, alkane sulfonic acids such as methane sulfonic acids and the like. To form an electrocoating bath, the solids of the electrocoating composition are generally reduced with an aqueous medium to the desired bath solids.

A blocked polyisocyanate crosslinking agent is used in the electrocoating composition. Preferred crosslinker agents for the above adduct are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate polymeric methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLES

The following emulsions 1-4 were prepared and each formulated into an electrocoating bath.

Emulsion 1-(Control)

The following ingredients were charged into a suitable reaction vessel: 953 parts Epon 828® (epoxy resin of diglycidyl ether of bisphenol A having an epoxy equivalent weight of 188); 274 parts bisphenol A; 343 parts ethoxylated bisphenol A having a hydroxy equivalent weight of 248 (Synfac 8009® from Milliken Company), 2 parts of dimethyl benzyl amine and 83 parts xylene. The resulting reaction mixture was heated to 160° C. under nitrogen blanket and held at this temperature for 1 hour. 3 parts dimethyl benzyl amine were added and the mixture was held at 147° C. until an epoxy equivalent weight of 1050 was obtained. 1371 parts of a blocked isocyanate crosslinker solution (75% solids, blocked with methanol, ethanol and diethylene glycol monobutyl ether with a 1:1:1.32 equivalent ratio of polymeric methylene diphenyl diisocyanate, PAPI 2027), 105 parts of diketimine (reaction product of diethylenetriamine and methyl isobutyl ketone at 72.7% solids) and 90 parts of methyl ethanol amine were added. The resulting mixture was held at 120° C. for 1 hour. The resulting resin was emulsified in 94 parts of 88% aqueous lactic acid and 4208 parts of deionized water. The emulsion was stripped to remove organic solvent and the resulting emulsion had a solids content of 36%.

Anticrater Agent Used with Emulsion 1

The anticrater agent was prepared by charging into a suitable reaction vessel 2322 parts by weight of Jeffamine D2000® (polyoxypropylene diamine having a number molecular weight of 2000 and an amine equivalent of 1000) and 188 parts by weight of Epon 828® (described above) was added under a nitrogen atmosphere and the resulting mixture was heated to about 90° C. and then 859 parts by weight of Epon 1001® (diglycidyl ether of bis phenol A having an epoxy equivalent weight of 500 from Shell Chemical Company) and 345 parts by weight of 2-butoxy ethanol. The resulting reaction mixture was dispersed by combing it with 68 parts of acetic acid and 5345 parts of deionized water. The resulting anti crater emulsion has a solids content of about 35%.

Emulsion 2-Containing Reacted Anticrater Agent

The following ingredients were charged into a suitable reaction vessel: 953 parts Epon 828® (described above); 274 parts bisphenol A; 343 parts ethoxylated bisphenol A having a hydroxy equivalent weight of 248 (Synfac 8009®), 2 parts of dimethyl benzyl amine and 83 parts xylene. The resulting reaction mixture was heated to 160° C. under nitrogen blanket and held at this temperature for 1 hour. 3 parts dimethyl benzyl amine were added and the mixture was held at 147° C. until an epoxy equivalent weight of 1050 was obtained. 1450 parts of a blocked isocyanate crosslinker solution (described above), 105 parts of diketimine (described above), 108 parts of Jeffamine D2000® (described above) and 82 parts of methyl ethanol amine were added. The resulting mixture was held at 120° C. for 1 hour. The resulting resin was emulsified in 94 parts of 88% aqueous lactic acid and 4363 parts of deionized water. The emulsion was stripped to remove organic solvent and the resulting emulsion had a solids content of 36%.

Emulsion 3-Containing Reacted Anticrater Agent and Siloxane

The following ingredients were charged into a suitable reaction vessel: 953 parts Epon 828® (described above); 274 parts bisphenol A; 343 parts ethoxylated bisphenol A having a hydroxy equivalent weight of 248 (Synfac 8009®), 2 parts of dimethyl benzyl amine and 83 parts xylene. The resulting reaction mixture was heated to 160° C. under nitrogen blanket and held at this temperature for 1 hour. 3 parts dimethyl benzyl amine were added and the mixture was held at 147° C. until an epoxy equivalent weight of 1050 was obtained. 1484 parts of a blocked isocyanate crosslinker solution (described above), 105 parts of diketimine (described above), 108 parts of Jeffamine D2000® (described above) and 82 parts of methyl ethanol amine were added. The resulting mixture was held at 120° for one hour. 38 parts of gamma-glycidoxypropyltrimethoxy silane were added and the mixture was held at 120° C. for 10 minutes. The resulting resin was emulsified in 94 parts of 88% aqueous lactic acid and 44671 parts of deionized water. The emulsion was stripped to remove organic solvent and the resulting emulsion had a solids content of 36%.

Emulsion 4-Containing Reacted Anticrater Agent and Siloxane

The following ingredients were charged into a suitable reaction vessel: 953 parts Epon 828® (described above); 274 parts bisphenol A; 343 parts ethoxylated bisphenol A having a hydroxy equivalent weight of 248 (Synfac 8009®), 2 parts of dimethyl benzyl amine and 83 parts xylene. The resulting reaction mixture was heated to 160° C. under nitrogen blanket and held at this temperature for 1 hour. 3 parts dimethyl benzyl amine were added and the mixture was held at 147° C. until an epoxy equivalent weight of 1050 was obtained. 1464 parts of a blocked isocyanate crosslinker solution (described above), 110 parts of diketimine (described above), 44 parts of Jeffamine D2000® (described above) and 86 parts of methyl ethanol amine were added.

The resulting mixture was held at 120° for one hour. 74 parts of gamma-glycidoxypropyltrimethoxy silane were added and the mixture was held at 120° C. for 10 minutes. The resulting resin was emulsified in 113 parts of 88% aqueous lactic acid and 4487 parts of deionized water. The emulsion was stripped to remove organic solvent and the resulting emulsion had a solids content of 36%.

Preparation of Quaternizing Agent

The quaternizing agent was prepared by adding 87 parts dimethylethanolamine to 320 parts ethylhexanol half-capped toluene diisocyanate in the reaction vessel at room temperature. An exothermic reaction occurred and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form quaternizing agent.

Preparation of Pigment Grinding Vehicle

The pigment grinding vehicle was prepared by charging 710 parts Epon 828® (described above), 0.8 parts of ethyl triphenyl phosphonium iodide and 290 parts bisphenol A into a suitable vessel under nitrogen blanket and heated to 150°–160° C. to initiate an exothermic reaction. The exothermic reaction was continued for about one hour at 150°–160° C. The reaction mixture was then cooled to 120° C. and 496 part of 2-ethylhexanol half capped toluene diisocyanate was added. The temperature of the reaction mixture was held at 110°–120° C. for one hour, followed by the addition of 1095 parts of 2-butoxyethanol, the reaction mixture was then cooled to 85°–90° C. and then 71 parts of deionized water was added followed by the addition of 496 parts quarternizing agent (prepared above). The temperature of the reaction mixture was held at 85°–90° C. until an acid value of about 1 was obtained.

| Preparation of Pigment Paste | Parts by Weight |
|---|---|
| Pigment grinding vehicle (prepared above) | 812 |
| Deionized water | 1660 |
| Titanium dioxide pigment | 1068 |
| Aluminum silicate pigment | 212 |
| Lead silicate pigment | 92 |
| Carbon black pigment | 32 |
| Dibutyl tin oxide | 124 |
| Total | 4000 |

The above ingredients were mixed until homogenous mixture was formed in a suitable mixing container. Then were dispersed by charging the mixture into a sand mill and then grinding until a Hegman reading of seven or greater was obtained.

Preparation of Electrocoating Baths 1–4

The following Electrocoating Baths 1–4 were prepared using the above emulsions:

| | Parts by Weight | | | |
|---|---|---|---|---|
| | Bath 1 (control) | Bath 2 | Bath 3 | Bath 4 |
| Emulsion 1 | 3173 | — | — | — |
| Emulsion 2 | — | 3341 | — | — |
| Emulsion 3 | — | — | 3341 | — |
| Emulsion 4 | — | — | — | 3341 |
| Anticrater Additive | 172 | — | — | — |
| Pigment Paste | 795 | 795 | 795 | 795 |
| Deionized Water | 3860 | 3864 | 3864 | 3864 |

Electrocoating Baths 1–4 were prepared by mixing the above ingredients. Each bath was then ultrafiltered. Phosphatized steel panels were electrocoated in each bath at 250–310 volts to obtain a film 0.8–0.9 mils (20.3–25.4 microns) thick on each panel. All of the electrocoated panels were baked at 182° C. for 17 minutes in an electric oven. Initial cratering was observed as the number of craters on the film. ASPP blow out crater test was used to test each bath. Crater resistance was rated according to the following rating scale of A–E:

A—0–10% defects
B—11–20% defects
C—21–40% defects
D—41–80% defects
E—Greater than 80% defects Adhesion of a primer surfacer to the electrocoated primer was determined by applying a polymeric melamine containing primer (DuPont's primer 764DG007) and baked under normal conditions. A standard tape adhesion test was used to measure adhesion between the primer surfacer and the electrocoated primer.

To measure edge corrosion resistance, knife blades (10× 20 cm) were electrocoated in each bath at a coating voltage that provided a 0.85 mil thick film. The coated knife blades were exposed to a salt spray for 7 days. The number of rust spots on each blade was counted by viewing the blades under a microscope.

The results of each of the above tests are shown in the following table:

| Bath | Initial Crater (number of craters) | Adhesion (rating 0–10, 0 is best) | Blowout Crater (rating A–E, A is best) | Knife Blade (number of rust spots) |
|---|---|---|---|---|
| 1 (Control) | none | 4 | D | 66 |
| 2 | none | 2 | C | 62 |
| 3 | none | 2 | B | 37 |
| 4 | none | 2 | A | 15 |

The results of the above tests show the following: the crater resistance of each of the baths was A since there were no craters or defects; the adhesion test, blowout crater test and knife blade rust spot test all showed that control electrocoating Bath 1 which contained the additive of the anticrater agent that was not prereacted with the film forming components of the electrocoating composition showed poorer adhesion, blowout crater resistance and knife blade rusting than did the film electrodeposited from each of the Baths 2–4 in which the anticrater agent was prereacted with the film forming components of the electrocoating compositions; Baths 3 and 4 which contained the silane component had improved blowout crater resistance and improved rust protection in comparison to Baths 1 and 2 that did not contain the silane component.

I claim:

1. An improved aqueous cathodic electrocoating composition having a binder of an epoxy-amine adduct and a blocked polyisocyanate crosslinking agent; wherein the improvement is the incorporation of an anticrater agent consisting of a polyoxyalkylene diamine having a number average molecular weight of about 700–5,000 by reacting the agent with the epoxy resin of the epoxy-amine adduct; wherein the amine to epoxy equivalence ratio of amine groups of the polyoxyalkylene diamine to epoxy groups of the epoxy amine adduct is about 0.01–0.90 to 1 and the resulting epoxy amine adduct has a number average molecular weight of about 1,500–20,000; where said molecular weights are determined by Gel Permeation Chromatography (GPC) using polystyrene as the standard.

2. The improved electrocoating composition of claim 1 in which the polyoxyalkylene diamine is a polyoxypropylene diamine having a weight average molecular weight of about 230–3,000.

3. The improved electrocoating composition of claim 1 containing about 0.01–8% by weight, based on the weight of the epoxy amine adduct, of a glycidoxy alkyl alkoxy silane which has been reacted with amine groups of the epoxy amine adduct.

4. The improved electrocoating composition of claim 3 in which the silane is gamma-glycidoxy propyl trimethoxy silane.

5. The improved electrocoating composition of claim 3 in which the polyoxyalkylene diamine is polyoxypropylene diamine having a weight average molecular weight of about 230–3,000 and used in an amine to epoxy equivalence ratio of about 0.01–0.2 to 1 and the silane is gamma-glycidoxy propyl trimethoxy silane in about 2–6% by weight, based on the weight of the epoxy amine-adduct.

6. The improved electrocoating composition of claim 1 in which the epoxy amine adduct is the reaction product of an epoxy resin of a diglycidyl ether and a polyphenol, extended with a polyphenol and an ethoxylated polyphenol and further reacted with an amine.

7. A method of preparing a cathodic electrocoating composition comprising the following steps in any workable order:

(a) preparing an epoxy-amine adduct by reacting an epoxy resin of a diglycidyl ether and a polyphenol which is extended with a polyphenol and an ethoxylated polyphenol and an amine;

(b) reacting the epoxy amine adduct with polyoxyalkylene diamine having a number average molecular weight of about 700–5,000 by reacting the agent with the epoxy resin of the epoxy-amine adduct; wherein the amine to epoxy equivalence ratio of amine groups of the polyoxyalkylene diamine to epoxy groups of the epoxy amine adduct is about 0.01–0.90 to 1 and the resulting epoxy amine adduct has a number average molecular weight of about 1,500–20,000; where said molecular weights are determined by Gel Permeation Chromatography (GPC) using polystyrene as the standard.

(c) preparing a blocked polyisocyanate crosslinking agent;

(d) blending the epoxy-amine adduct of step (b) with the blocked polyisocyanate crosslinking agent;

(e) neutralizing the epoxy-amine adduct with an organic acid to form an emulsion; and (f) blending the emulsion with a pigment paste to form the electrocoating composition.

8. The method of claim 7 in which the polyoxyalkylene diamine is polyoxypropylene diamine having a weight average molecular weight of about 230–3,000.

9. The method of claim 7 in which about 0.01–8% by weight, based on the weight of the epoxy amine adduct, of a glycidoxy alkyl alkoxy silane is reacted with amine groups of the epoxy amine adduct.

10. The method of claim 7 in which the polyoxy alkylene diamine is polyoxy propylene diamine having a weight average molecular weight of about 230–3,000 and used in an amine to epoxy equivalence of 0.01–0.2 to 1 and about 2–6% by weight, based on the weight of the epoxy amine adduct, of a glycidoxy propyl trimethoxy silane which is reacted with amine groups of the epoxy amine adduct.

* * * * *